June 30, 1970  P. E. WEBER  3,518,005
OPTICAL BORESIGHT DEVICE
Filed Jan. 4, 1967
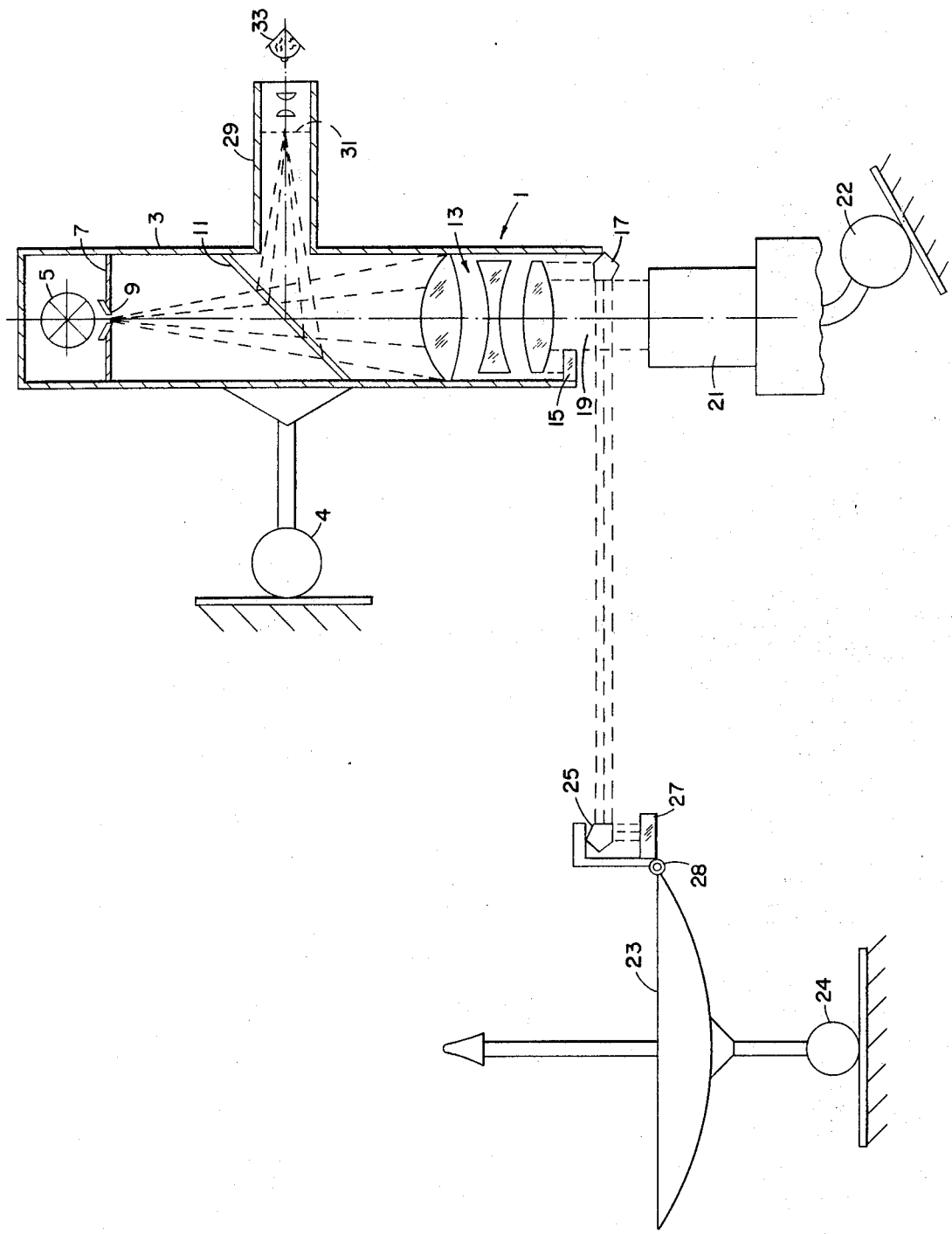
Paul E. Weber,
INVENTOR.
BY Harry M. Saragovitz
Edward J. Kelly
Herbert Berl
James T. Deaton

United States Patent Office 3,518,005
Patented June 30, 1970

3,518,005
OPTICAL BORESIGHT DEVICE
Paul E. Weber, Wheeling, Ill., assignor, by mesne assignments, to the United States of America as represented by the Secretary of the Army
Filed Jan. 4, 1967, Ser. No. 609,268
Int. Cl. G01b *11/26*
U.S. Cl. 356—138   5 Claims

ABSTRACT OF THE DISCLOSURE

An optical boresighting device in which light from a common source is passed through an objective lens system and is then transmitted to three locations. Each of the three locations has means which reflects the light in a return path onto a reticle. When each of the three light parts are superimposed at the reticle, the axes of the devices that contain the three means are in parallel and boresighted. The devices in this case are an optical instrument and a radar antenna that are adjustable to enable one to cause the reflected light parts to be superimposed at the reticle.

---

In the field of boresighting, a need has arisen for a device which will enable a person to boresight one or more optical instruments with a radar instrument at any time in order to correlate optical data and radar data of a common target. Because it is necessary to take the optical instruments from their pedestals each time bad weather or other disturbances are expected, and to put the optical instruments on the pedestals again when measurements have to be made, the boresighting procedure has to be repeated. In the existing system, each instrument is supplied with a boresighting telescope and each time a balloon is released, it is possible to do the boresighting procedure only as long as the balloon is visible. That is, when the balloon is released, operators looking through the telescopes on the instruments adjust the instruments to where the instruments are looking at the same object, namely the balloon that has been released. When the instruments have been boresighted by this procedure, the axes of the instruments are generally parallel. Therefore, this procedure is limited to daytime use. Also, the balloon may disappear behind a cloud shortly after release and may only be seen intermittently further on. To avoid such difficulties and to be able to boresight every time necessary, a special boresighting device is provided.

Therefore, it is an object of this invention to provide a boresight device that will enable one to boresight a radar and an optical instrument at any time.

Another object of this invention is to provide a boresight device that enables the operator to boresight a radar and an optical instrument without the necessity for repeatedly relying on a special target.

A further object of this invention is to provide a boresight device that is highly accurate in aligning the axis of a radar and the axis of an optical instrument.

In accordance with this invention, a new boresight device is provided that includes optical means for aligning the axis of a radar with the axis of an optical instrument.

In the accompanying drawing forming a part of this specification, the single figure of the drawing is a plan view, with portions in section, of the boresight device.

The invention may be better understood by referring to the drawing in which numeral 1 designates an optical boresight device. The optical boresight device includes a hollow housing 3 which is adjustably mounted in a conventional manner to support 4. A light source 5 is mounted in the housing and, a plate 7, which has a pinhole 9 therethrough, is fixed in the housing adjacent light source 5. A semi-transparent mirror 11 is mounted in the housing in front of plate 7, and an objective lens system 13, for converting the light rays from the pinhole source into parallel rays, is mounted in front of semi-transparent mirror 11. A first plane surface mirror 15 is mounted at one end of housing 3 and to one side, and a pentaprism 17 is mounted at said one end of housing 3 and on the opposite side of said housing from mirror 15. A space 19 is left between mirror 15 and pentaprism 17 to pass a portion of the parallel rays into an optical instrument such as camera 21 for aligning the optical axis of the boresight device with that of the camera. Camera 21 is adjustably mounted in a conventional manner on pedestal 22.

A radar antenna 23 is located at one side of the optical boresight device and has a pentaprism 25 and second plane surface mirror 27 adjustably mounted in a conventional manner at 28. Antenna 23 is also adjustably mounted in a conventional manner on pedestal 24.

An eyepiece 29, having a reticle 31 therein, projects from one side of housing 3 so that an eye 33 may visually determine if the reflected light parts on the reticle are super-imposed.

In operation, light passing through pinhole 9 to objective lens system 13 is divided into three parallel parts. A first part goes to first plane surface mirror 15, a second part goes to pentaprism 17, and a third part goes through space 19 to optical instrument 21.

The first light part is reflected back by first plane surface mirror 15 toward light source 5 and is then deflected by semi-transparent mirror 11 onto reticle 31 of eyepiece 29 to mark the position of the optical axis of the boresight device.

The second part of light goes to pentaprism 17 and is deflected 90 degrees toward pentaprism 25 mounted on the antenna. The second part of light is deflected by pentaprism 25 another 90 degrees onto second plane surface mirror 27. Second plane surface mirror 27 reflects the second light part back toward the light source the same way it entered, and by means of semitransparent mirror 11, a pin-point image of the second light part will be visible on the reticle in the eyepiece. The images of the first and second light parts will be superimposed on the reticle only when the direction of the returning light beam from the second light part is the same as the direction of the outgoing light beam of the first light part. This will be the case only if the optical axis of the light source is parallel to the beam axis of the radar. Therefore, the axis of the light beam of the third part leaving the light source will also be parallel to the beam axis of the radar, and the optical instrument or instruments can be boresighted with this latter light part by adjusting the optical instrument until the optical axis of the light source and the optical axis of the optical instrument coincide.

The following procedure has to be accomplished only once in the beginning to set up the boresight device and make it workable.

(a) The radar beam axis and the optical axis of the optical instrument have to be boresighted at a common target in a conventional manner.

(b) The optical boresight device has to be mounted in front of the optical instrument, that has been boresighted, in such a way that the optical axis of the optical boresight device and the optical axis of the optical instrument coincide.

(c) The pentaprism and the mirror at the radar have to be adjusted so that the reflected first and second light parts on the reticle of the eyepiece coincide.

After this has been done, the optical boresight device is set and can be used repeatedly to boresight the optical instrument and the radar by the following procedure.

(a) The optical boresight device has to be mounted in front of the optical instrument and relative to the radar in such a way that the first and second reflected light parts on the reticle of the eyepiece coincide.

(b) The optical instrument has to be adjusted so that the optical axis of the instrument and the optical axis of the boresight device coincide. With this simple procedure, the optical axis of the optical instrument will be boresighted with the beam axis of the radar. By repeating this procedure, a plurality of optical instruments can be boresighted.

It is also pointed out that the radar and optical instrument or instruments are mounted relatively close together, and when boresighted, the beam axis and the optical axis are parellel or substantially parallel since the object to be tracked is so far away that the distance between the instruments and the tracked object can for practical purposes be considered as infinity.

I claim:

1. An optical boresight device for aligning the axis of a radar antenna with the axis of an optical instrument, said device including: a housing; a light source in said housing; means for transmitting a first portion of light from said light source to a mirror in said housing, said mirror reflecting said first portion and means deflecting said reflected first portion onto a reticle of an eyepiece; said transmitting means transmitting a second portion of light from said light source to a pentaprism on said housing, said pentaprism deflecting said second portion to means on a radar antenna adjacent said housing, said means on said radar antenna reflecting said serond portion in a reverse direction back toward said light source, said deflecting means deflecting said reflected second portion onto said reticle; and said transmitting means transmitting a third portion of light from said light source to an optical instrument to provide a means by which the optical axis of the boresight device is aligned with the optical axis of an optical instrument.

2. An optical boresight device as set forth in claim 1, wherein said transmitting means includes a plate that has a pin-hole therethrough and an objective lens system which converts a beam of light from said light source into parallel rays of light.

3. An optical boresight device as set forth in claim 1 in which said deflecting means is a semitransparent mirror.

4. An optical boresight device as set forth in claim 1, in which said means on said radar antenna includes a pentaprism and a plane surface mirror that may be adjusted relative to said radar antenna and therefore said housing and optical instrument.

5. An optical borsesight device for boresighting an optical instrument and a radar antenna including: a hollow housing; a light source mounted at one end in said housing; means providing a pinhole through which a light beam from said light source may pass; a semitransparent mirror and an objective lens system mounted in series in said housing and receiving said light beam from said source; said objective lens system converting said light beam into parallel rays, said parallel rays being divided into three portions, a first portion of said parallel rays being transmitted to a plane surface mirror on a second end and to one side of said housing, said mirror reflecting said first portion of said light rays back toward the light and onto the semitransparent mirror which deflects the reflected light onto a reticle of an eyepiece mounted on the side of the housing between the objective lens system and the semitransparent mirror; a second portion of said parallel rays being transmitted to a prism on said second end of said housing opposite said mirror, said second portion passing through said prism and onto means on an instrument beside said housing, said means reflecting said second portion back toward said light source and onto said reticle, and a third portion of said parallel rays being used to align the optical axis of the boresight device with the optical axis of an optical instrument.

References Cited

UNITED STATES PATENTS 3,290,986  12/1966  Woehl _____ 356—138

RONALD L. WIBERT, Primary Examiner

P. K. GODWIN, JR., Assistant Examiner

U.S. Cl. X.R.

356—144, 146, 153, 156, 172